May 16, 1933.  G. C. THOMAS, JR  1,909,136
CONDUIT BOX
Filed July 24, 1929   2 Sheets-Sheet 1
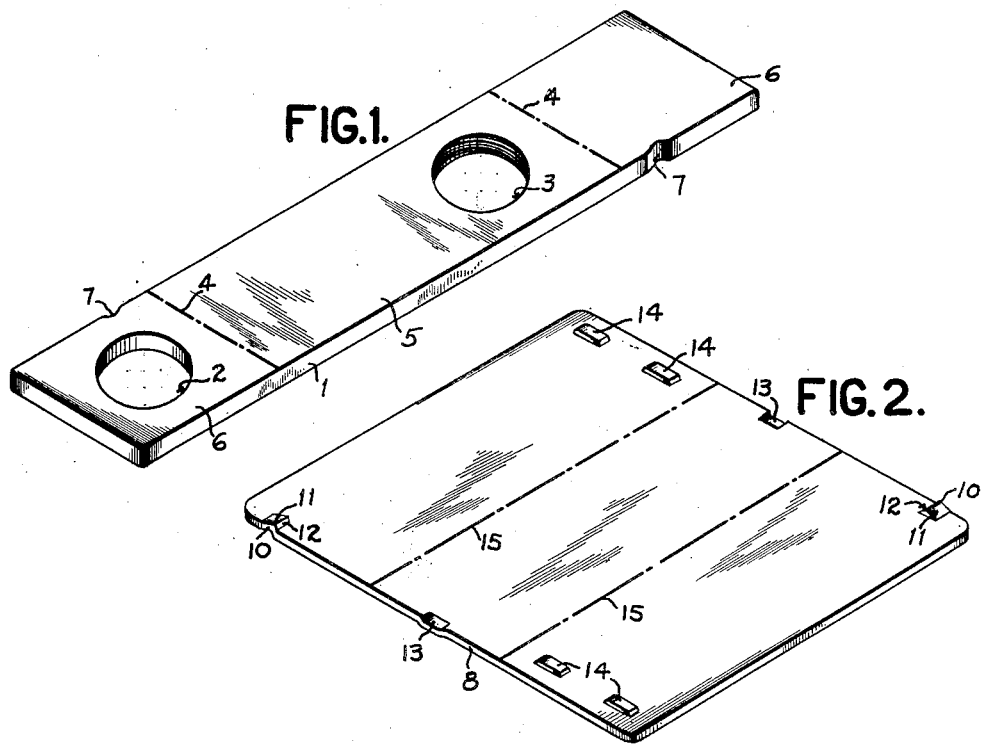
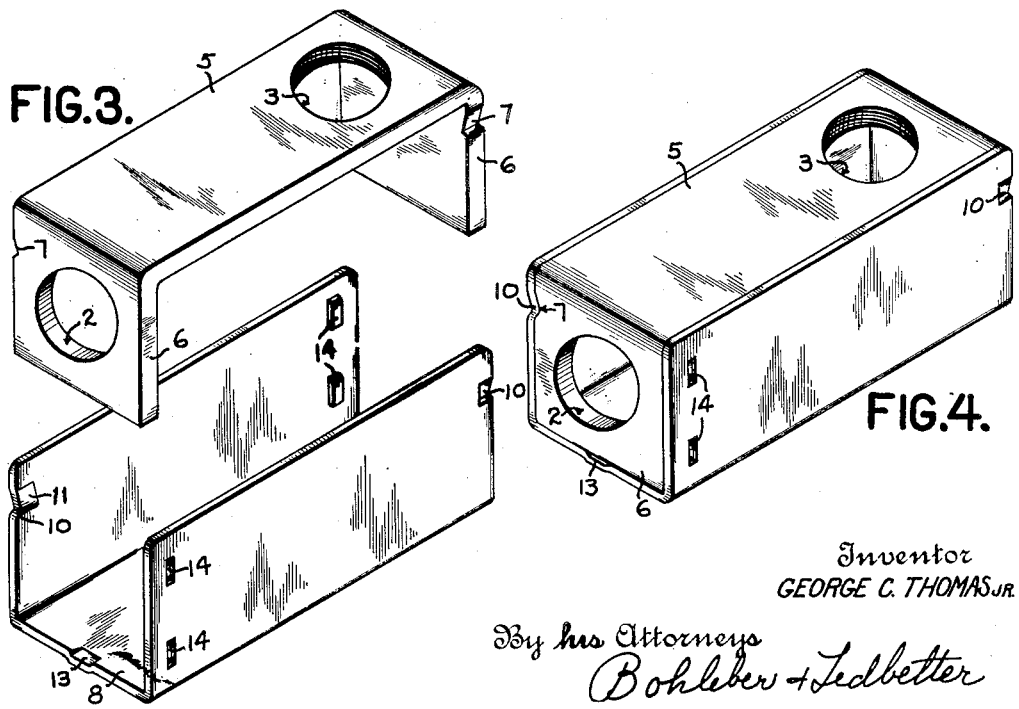
Inventor
GEORGE C. THOMAS JR.
By his Attorneys
Bohleber + Ledbetter May 16, 1933.                G. C. THOMAS, JR                1,909,136
                              CONDUIT BOX
                           Filed July 24, 1929          2 Sheets-Sheet 2

Inventor
GEORGE C. THOMAS JR
By his Attorneys
Bohleber & Ledbetter

Patented May 16, 1933

1,909,136

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

CONDUIT BOX

Application filed July 24, 1929. Serial No. 380,489.

This invention relates to conduit boxes such as are used for electrical house wiring and may be used for any purpose for which an outlet or junction box may be used. Conduit boxes are customarily formed of a single piece of metal which is cast or punched out of sheet metal so that the bottom and the four sides comprise a single piece with the remaining side closed by a plate. The box described herein is constructed of two U-shaped pieces which are assembled together to form a box which has six sides and thereby completely enclosing the wires which are carried to the box and may be spliced therein with drop cords or extensions as desired. Any type of connection may be made from the box such as a connection for a drop light in which the wire to the light passes through an opening in one side of the box or a lighting fixture may be secured directly to the box and wiring connection made thereto.

It is an object of this invention to construct a conduit box which is made in two parts each of which parts comprise respectively three of the six sides of the conduit box.

Another object is to form a conduit box of two pieces which are bent to form three sides of the box respectively which parts are secured together by an easily releasable locking means.

Other objects of the invention will be more apparent from the accompanying description taken in connection with the drawings in which:

Figure 1 shows a sheet metal blank which is bent to form three sides of the box.

Figure 2 shows a blank which is bent to form the three remaining sides of the box not provided for by the blank of Figure 1.

Figure 3 shows the blanks of Figure 1 and Figure 2 bent into their finished U-shaped form and in position for interengagement to form the six sides of the finished box.

Figure 4 shows the two parts of the box in assembled position.

Figure 5:
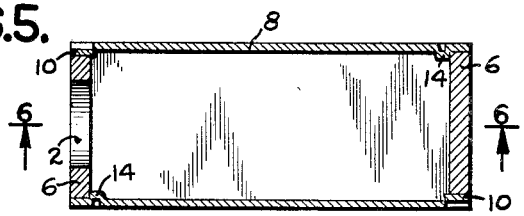
Figure 5 is a section along the line 5—5 of Figure 7 showing the means by which the parts are secured together.
Figure 6:
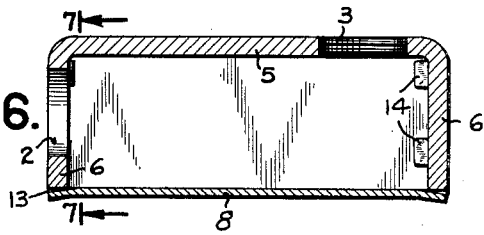
Figure 6 is a longitudinal section of the box along the line 7—7 of Figure 5 showing the manner in which the two parts of the box interengage.
Figure 7:
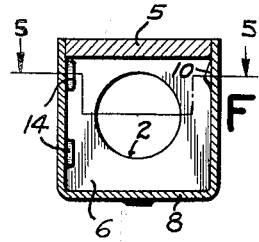
Figure 7 is a section through the sides of the box along the lines 7—7 of Figure 6.

The conduit box of this invention is easily manufactured in that it requires merely two elements which are formed of sheet material and provided with certain indentations or projections which have certain functions to be described and which is bent along two parallel bending axes to form respectively three sides of the completed box. The box is provided with suitable means for retaining or locking the two parts together and the usual openings are also provided to enable the anchoring of conduit pipe to the box and the passage of electrical wires thereinto.

Referring to Figure 1 the blank 1 is shown preferably formed of relatively thick material and having box hole openings 2 and 3 for anchoring conduit pipe or other electrical wiring construction to the box. Although the box hole opening 3 is shown as being threaded and the box hole opening 2 is shown as a plain opening it is to be understood that these openings may be threaded or plain as desired and depends upon the manner in which the pipe is to be secured within the box hole opening. This blank is preferably of sufficient thickness to be rigid and inflexible and also to enable sufficient screw threads to be formed in the box hole opening to enable a conduit pipe or any form of threaded member to obtain a firm threaded anchorage therein. The blank is bent into U-shaped form along the two parallel bending axes 4 shown in dot and dash line to form both ends and one side or three sides of the box. The U-shaped member formed by bending the blank 1 comprises the bottom 5 and the ends 6 of the conduit box. Notches or recesses 7 are provided in the edges of the ends 6 of the box, the purpose of which will be subsequently described. This blank bent into its finished form is shown in Figure 3 in position to be assembled with the second member which completes the box.

The remaining three sides of the conduit box are formed preferably from a blank 8 which is of relatively thinner sheet metal than the material forming the bottom and ends of the conduit box described above, in order that it have a certain degree of flexibility and resilience. Along one edge of the blank and adjacent to the corner is a projection 10. This projection has a relatively long wedging or inclined face 11 and a relatively short and sharp edge 12. Along the same edge of the blank as the projection 10 and centrally thereof is a notch 13, and at the other end of the same edge there are a pair of projections 14 spaced equidistant from the edge and separated from each other. The opposite edge of the blank 8 is provided with a duplicate projection 10, notch 13 and pair of projections 14. This blank is bent along the bending axes 15 indicated by the dot and dash lines into the U-shaped form shown in Figure 3 in which it will be noted that the projections 10 and 14 are formed in the arms of the U and that the notch 13 is formed in the connecting member joining the arms. As will be described later in this description the projections form snap locking means and utilize the flexibility of the material to snap lock the parts together. It will be clear therefore that the sides alone or the arms only of the flexible U-shaped member need be flexible and that the side connecting these two together may be rigid and without flexibility.

In assembling the conduit box the flexible member 8 of the box is positioned so that its ends coincide with the ends 6 of the rigid member 1. The flexible portion 8 is then pressed between the ends 6 of the box. The projections 10 with their relatively long inclines 11 engage the edges of the ends 6 respectively and the sides are flexed apart by the wedging action resulting from the inclined edge 11 of the projection. The guide or stop projections 14 serve to keep the two U-shaped members with their ends coinciding during the assembly of the box. When the flexible member 8 has been pressed fully onto the rigid member 1, the projections 10 snap into the recesses 7 in the edges of the box ends 6 and lock or clamp the two members together by the clamping action of the two flexible sides of the flexible member. The relatively sharp perpendicular portion 12 of the projection 10 engages with a corresponding sharp portion of the recesses 7 thereby securely clamping or locking the two parts together and preventing inadvertent separation of the two members. In assembled position the projections or lugs 14 serve as stops preventing relative longitudinal movement between the two parts which would enable the locking means formed by the projections 10 and the recesses 7 to be easily disengaged. It is clear that other means may be resorted to, to serve the same purpose as the lugs 14. Such means may take the form of a groove in the flexible member or the ends of this member may be bent inwardly around the outside of the ends 6 forming a stop against axial displacement of these two members. Many other methods of accomplishing the same result may be conceived by anyone skilled in the art.

The projections 10 in the flexible member with their cooperating recesses 7 in the rigid member form snap locking means and it is clear that the projection may be provided if desired upon the rigid end 6 and the depression or an opening may be provided in the side of the flexible member for snap interengagement. Other means which may be snap engaging or a rigid locking means such as a screw may be resorted to, to retain these two parts in interengaged or assembled relation.

The recesses 13 are provided at the edge of the flexible member to enable the insertion of a screw driver or other tool therein to give a prying leverage for separating the two members and releasing the snap locking means. This recess or depression may be provided in the end of member 6 as well as in the flexible member 8.

Figure 8:
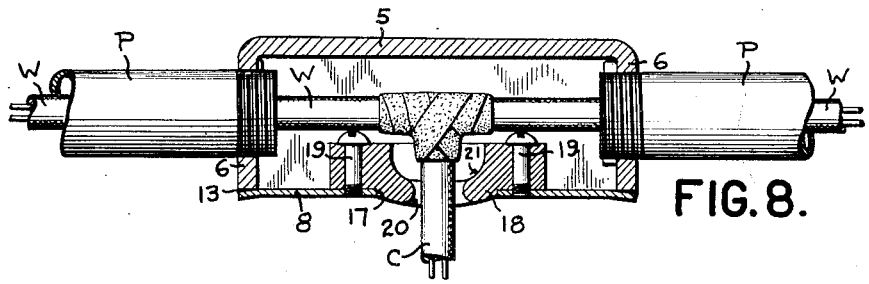
Figure 8 is a longitudinal section through the box showing the box with conduit pipes leading and secured thereto and carrying an insulating member through which passes wiring for connection with a lighting fixture of the drop light type.

As shown in Figure 8, the conduit box is mounted for use with the conduit pipes P threaded into the box hole openings and electrical wiring is carried within the pipe to the conduit box where it is spliced to a drop cord C. An opening 17 is provided in the bottom of the flexible member 8 within which is inserted an insulating ring 18, secured to the flexible member by screws 19. The insulating ring has a smooth rounded opening 20 through which the drop cord passes and protects the cord against abrasion. The hole 20 opens out into a larger opening 21 to give ample space for the spliced wiring within the box.

Figure 9:
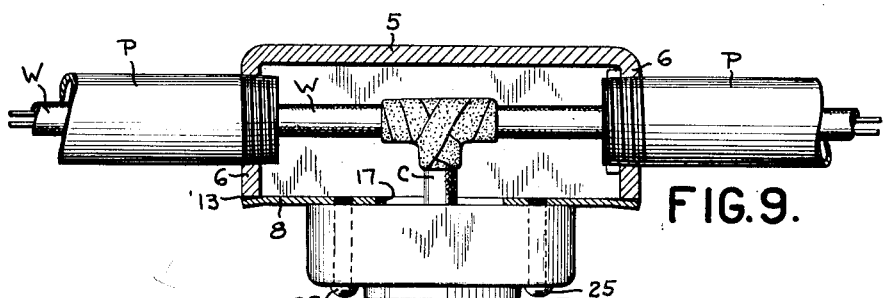
Figure 9 is a longitudinal section showing the box connected to conduit pipe carrying wires to the box and a lamp socket and switch attached to the box.

In Figure 9, the conduit box is shown as carrying a lamp socket and switch 24 which is secured to the conduit box by the screws 25. The drop cord C in this mounting is carried through the opening 17 to the switch contacts of the socket as is well known in the art. This form of construction is suitable for ceiling or wall lights.

Figure 10:
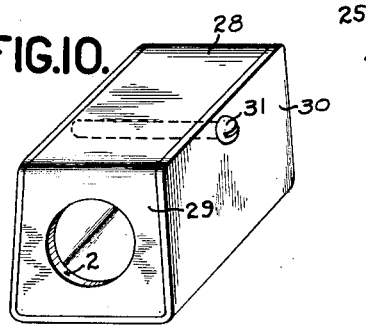
Figure 10 shows a modified form of the conduit box in which the box itself is wedge-shaped for securing the two parts together against separation.

The conduit box shown in Figure 10 is a modified structure of the conduit box shown in the other figures of the drawings and described above. In this modified form the box is constructed of two U-shaped members as heretofore described in which a rigid U-shaped member 28 forms one side and two ends 29 of the box and a second U-shaped member 30, of resilient or flexible material, forms the remaining three sides. The conduit opening 2 is provided as in the first form. In this construction, the projection and depression snap locking means is not used, and in place thereof the ends 29 of the box are tapered outwardly or wedge shaped with the greatest width at its bottom or free end, and the flexible member 30 is bent with the sides forming the arms of the U, being bent tapered inwardly to form a taper which cooperates with the taper on the rigid member to lock the two members together against separation. In this construction, the flexible member 30 may be slid longitudinally onto the rigid member without flexing the flexible member, since there are no lugs opposing longitudinal movement, and locked or secured in position by means of the screw 31 which draws the arms of the flexible U-shaped member together to clamp it to the rigid member.

These two parts may also be assembled by spreading the arms of the flexible member apart so that it will pass transversely over the wide bottom edge of the wedge shaped ends 29 and snap into clamping or locking relation with the rigid member in essentially the same way that the first form is assembled. This modified form may also have the stop and guide lugs or projections 14 of the first form in which case the screw 31 may be dispensed with, and the two U-shaped members will remain in locked relation due to these lugs preventing longitudinal separation and the wedge shaped ends cooperating with the flexible member, which is also wedge shaped when viewed from the ends, from lateral separation of the two members.

Various modifications and alterations may be made in the specific structure shown and described in this application without deviating from the scope of my invention and it is to be understood that I do not intend to limit my invention excepting as defined in the accompanying claims.

What is claimed is:—

1. A conduit box comprising a rigid member bent into a U-shape and forming one side and the ends of the box, a flexible member bent into a U-shape and forming three sides of the box, lugs upon the inner faces of the flexible member and abutting the ends of the rigid member to retain both members against relative axial displacement and snap locking means to retain the members against separation.

2. A conduit box comprising a rigid member formed from a bar bent into a U-shape and forming one side and the ends of the box, a flexible member bent into a U-shape and forming three sides of the box, the legs of the U being flexible, means to retain the members against relative axial movement, and resilient locking means utilizing the resiliency of the legs of the flexible U-shaped member including a recess upon one of said members and a projection upon the other member for engagement with the recess to resiliently lock the members together against separation.

3. A conduit box comprising a rigid member bent into a U-shape and forming one side and the ends of the box, a flexible member bent into a U-shape and forming three sides of the box, the legs of the U being flexible, means to retain the members against relative axial movement, and resilient locking means utilizing the resiliency of the legs of the flexible U-shaped member including a recess upon the rigid member and a projection upon the flexible member for engagement with the recess to lock the members together against separation.

4. A conduit box comprising a rigid member bent into a U-shape and forming one side and the ends of the box, a flexible member bent into a U-shape and forming three sides of the box, the legs of the U being flexible, means to retain the members against relative axial movement, and resilient locking means utilizing the resiliency of the legs of the flexible U-shaped member including a recess upon the rigid member, and a projection upon the flexible member for engagement with the recess to lock the members together against separation, and a recess between the members for insertion of a tool to separate the members from locking engagement.

5. A conduit box comprising a rigid member bent into a U-shape and forming one side and the ends of the box, a flexible member bent into a U-shape and forming three sides of the box, the legs of the U being flexible, means to retain the members against relative axial movement, and resilient locking means utilizing the resiliency of the legs of the flexible U-shaped member including a recess upon the rigid member and a projection upon the flexible member for engagement with the recess to lock the members together against separation, a recess between the members for insertion of a tool to separate the members from locking engagement and an opening in the flexible member forming a wire outlet from the box.

6. A conduit box comprising a rigid member bent into a U-shape and forming one side and the ends of the box, a flexible member bent into a U-shape and forming three sides of the box, the legs of the U being flexible, means to retain the members against relative axial movement, and resilient locking means utilizing the resiliency of the legs of the flexible U-shaped member including a recess upon the rigid member and a projection upon the flexible member for engagement with the recess to lock the members together against separation, a recess between the members for insertion of a tool to separate the members from locking engagement, an opening in the flexible member forming a wire outlet from the box and an insulating member secured at the opening forming an insulated wire outlet from the box.

7. A conduit box comprising a rigid member bent into a U-shape and forming three sides of a box, a flexible member bent into U-shape and forming the remaining three sides of the box, lugs upon either side of the flexible member for contact with the ends of the rigid U-shaped member to prevent relative longitudinal displacement of the U-shaped members, a depression in one edge of each arm of the rigid U-shaped member and a projection upon each arm of the flexible U-shaped member cooperating with the depression to form snap locking means.

In testimony whereof I affix my signature.

GEORGE C. THOMAS, Jr.